US010212339B2

(12) United States Patent
Chen et al.

(10) Patent No.: US 10,212,339 B2
(45) Date of Patent: Feb. 19, 2019

(54) IMAGE GENERATION METHOD BASED ON DUAL CAMERA MODULE AND DUAL CAMERA APPARATUS

(71) Applicant: Yulong Computer Telecommunication Scientific (Shenzhen) Co., Ltd., Shenzhen, Guangdong (CN)

(72) Inventors: Neng Chen, Guangdong (CN); Qiang Wang, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 86 days.

(21) Appl. No.: 15/385,269

(22) Filed: Dec. 20, 2016

(65) Prior Publication Data

US 2017/0099435 A1    Apr. 6, 2017

Related U.S. Application Data

(63) Continuation of application No. PCT/CN2014/089154, filed on Oct. 22, 2014.

(51) Int. Cl.
| | |
|---|---|
| *H04N 5/232* | (2006.01) |
| *H04N 9/09* | (2006.01) |
| *H04N 9/64* | (2006.01) |
| *H04N 9/77* | (2006.01) |

(52) U.S. Cl.
CPC ......... *H04N 5/23232* (2013.01); *H04N 5/232* (2013.01); *H04N 9/09* (2013.01); *H04N 9/64* (2013.01); *H04N 9/77* (2013.01)

(58) Field of Classification Search
CPC .................................................. H04N 5/23232
See application file for complete search history.

(56) References Cited

U.S. PATENT DOCUMENTS

| | | | | |
|---|---|---|---|---|
| 3,697,675 | A | * 10/1972 | Beard | ................ H04N 13/0431 |
| | | | | 348/60 |
| 5,045,932 | A | 9/1991 | Sharman et al. | |
| 5,852,502 | A | * 12/1998 | Beckett | ................ G11B 27/031 |
| | | | | 358/512 |

(Continued)

FOREIGN PATENT DOCUMENTS

| | | |
|---|---|---|
| CN | 103024272 A | 4/2013 |
| CN | 103780840 A | 5/2014 |

(Continued)

OTHER PUBLICATIONS

Extended European search report issued in corresponding European application No. 14904333.3 dated Dec. 21, 2017.

*Primary Examiner* — Cynthia Segura
(74) *Attorney, Agent, or Firm* — Young Basile Hanlon & MacFarlane, P.C.

(57) ABSTRACT

Provided is image generation based on a dual camera module. The dual camera module comprises a first camera lens of a large single-pixel size and a second camera lens of a high resolution. The first camera lens generates a first image. The second camera lens generates a second image. The first image and the second image are synthesized to generate a third image. Correspondingly, also provided is a dual camera module. With the dual camera module, by combining the advantages of the two camera lens, color noise and luminance noise of an image are reduced.

12 Claims, 5 Drawing Sheets

(56) References Cited

U.S. PATENT DOCUMENTS

| | | |
|---|---|---|
| 6,614,471 B1 | 9/2003 | Ott |
| 7,072,504 B2* | 7/2006 | Miyano .................. A61B 5/0064 |
| | | 382/154 |
| 7,619,656 B2* | 11/2009 | Ben-Ezra .................. G06T 5/50 |
| | | 348/208.12 |
| 8,576,302 B2* | 11/2013 | Yoshikawa .......... H04N 5/2258 |
| | | 348/234 |
| 9,319,585 B1* | 4/2016 | Liu ........................... H04N 9/07 |
| 9,538,152 B2* | 1/2017 | Shabtay ............. H04N 5/23296 |
| 9,930,316 B2* | 3/2018 | Zhang .................. H04N 13/025 |
| 9,936,109 B2* | 4/2018 | Zhang .................. H04N 13/025 |
| 2006/0119710 A1* | 6/2006 | Ben-Ezra .................. G06T 5/50 |
| | | 348/208.99 |
| 2007/0018995 A1* | 1/2007 | Koyanagi .................. H04N 1/46 |
| | | 345/589 |
| 2008/0024390 A1* | 1/2008 | Baker .................... G06T 3/4053 |
| | | 345/1.3 |
| 2008/0030611 A1* | 2/2008 | Jenkins .................. H04N 9/045 |
| | | 348/336 |
| 2010/0201831 A1* | 8/2010 | Weinstein ............. H04N 9/045 |
| | | 348/221.1 |
| 2010/0283863 A1 | 11/2010 | Yamamoto |
| 2010/0309315 A1* | 12/2010 | Hogasten .................. H04N 5/33 |
| | | 348/164 |
| 2011/0115954 A1* | 5/2011 | Compton ............. H04N 5/3696 |
| | | 348/272 |
| 2011/0279698 A1* | 11/2011 | Yoshikawa .......... H04N 5/2258 |
| | | 348/222.1 |
| 2011/0298951 A1* | 12/2011 | Yoshikawa .......... H04N 5/2258 |
| | | 348/234 |
| 2013/0016251 A1 | 1/2013 | Ogasahara |
| 2013/0076910 A1* | 3/2013 | Scott ...................... H04N 5/332 |
| | | 348/164 |
| 2013/0335599 A1* | 12/2013 | Zhang .................... H04N 5/225 |
| | | 348/239 |
| 2015/0116526 A1* | 4/2015 | Meng ........................ G06T 5/50 |
| | | 348/218.1 |
| 2015/0288950 A1* | 10/2015 | Zhang .................. H04N 13/025 |
| | | 348/47 |
| 2017/0251134 A1* | 8/2017 | Zhang .................. H04N 5/2258 |
| 2018/0332207 A1* | 11/2018 | Yamamoto ............. H04N 5/225 |

FOREIGN PATENT DOCUMENTS

| | | |
|---|---|---|
| CN | 104010135 A | 8/2014 |
| WO | 1998015126 A | 4/1998 |

* cited by examiner

IMAGE GENERATION METHOD BASED ON DUAL CAMERA MODULE AND DUAL CAMERA APPARATUS

CROSS-REFERENCE TO RELATED APPLICATION(S)

This application is a continuation of International Application No. PCT/CN2014/089154, filed on Oct. 22, 2014, the disclosure of which is herein incorporated by reference in its entirety.

TECHNICAL FIELD

The present disclosure relates to image generation and processing, and particularly to image generation based on a dual camera module and a dual camera apparatus.

BACKGROUND

Generally, a camera module design has one camera (sensor) while, on the other hand, requirements on height, resolution, and image quality of the camera module are increasing high. It is often difficult for a single camera module to meet the requirements. If it is required to increase the resolution of a camera without increasing the module height of the camera module, the single pixel size will become smaller and the image quality will be distorted, such as with severe noise. "Single-pixel size" refers to the size of each pixel. Larger pixel can result in better photosensitive as well as less color noise. The module height of the camera module may need to be increased in order to maintain the image quality, and this will greatly reduce the user experience. For example, for a camera with the resolution of 8 M (megabytes), the module height needs to be 5 mm or more. With increasing resolution, a camera module with 13 M or higher resolution may need more module height. However, coordination between resolution, image quality, and module height of the camera module can be difficult to be achieved. For a camera module adopting dual camera design, it has only a certain improvement in the resolution while the image quality is still not improved.

SUMMARY

The present disclosure provides an image generation method based on a dual camera module and a dual camera module. With the dual camera module, the present disclosure, by combining advantages of two kinds of cameras, can reduce color noise and luminance noise of an image, whereby improving image quality as well as image luminance and details.

The present disclosure provides an image generation method based on a dual camera module, the dual camera module includes a first camera with large single pixel size and a second camera with high resolution.

The image generation method includes the following steps: generating a first image by the first camera; generating a second image by the second camera; and synthesizing the first image and the second image to generate a third image.

According to the image generation method, the first camera is configured to have low resolution and large single pixel size, the second camera is configured to have high resolution and small single pixel size.

According to the image generation method, the resolution of the first camera is configured to be less than or equal to a first resolution threshold set in advance, the single pixel size of the first camera is configured to be greater than or equal to a first single pixel size threshold set in advance; the resolution of the second camera is configured to be greater than or equal to a second resolution threshold set in advance, the single pixel size of the second camera is configured to be less than or equal to a second single pixel size threshold set in advance.

According to the image generation method, the first resolution threshold and the second resolution threshold can be the same or different; the first single pixel size threshold and the second single pixel size threshold can be the same or different.

According to the image generation method, the first resolution threshold is 8 M, the second resolution threshold is 13 M; the first single pixel size threshold is $1.5*1.5\ \mu m^2$, the second single pixel size threshold is $1.4*1.4\ \mu m^2$.

According to the image generation method, the process of synthesizing the first image and the second image to generate the third image includes: extracting a first color signal from the first image; extracting a second luminance signal from the second image; and synthesizing the first color signal and the second luminance signal to generate the third image.

According to the image generation method, the process of synthesizing the first image and the second image to generate the third image includes: extracting a first color signal and a first luminance signal from the first image; extracting a second luminance signal from the second image; synthesizing the first luminance signal and the second luminance signal to obtain a third luminance signal; and synthesizing the first color signal and the third luminance signal to generate the third image.

According to the image generation method, the process of synthesizing the first image and the second image to generate the third image includes: extracting a first color signal and a first luminance signal from the first image; extracting a second color signal and a second luminance signal from the second image; synthesizing the first color signal and the second color signal to obtain a third color signal; synthesizing the first luminance signal and the second luminance signal to obtain a third luminance signal; and synthesizing the third color signal and the third luminance signal to generate the third image.

According to the image generation method, the process of synthesizing the first image and the second image to generate the third image includes: extracting a first color signal from the first image; extracting a second color signal and a second luminance signal from the second image; synthesizing the first color signal and the second color signal to obtain a third color signal; and synthesizing the third color signal and the second luminance signal to generate the third image.

According to the image generation method, the first camera is a color camera, and the second camera is a monochrome camera.

The present disclosure further provides a dual camera apparatus, including: a first camera with large single pixel size, configured to generate a first image; a second camera with high resolution, configured to generate a second image; an image processor, configured to synthesize the first image and the second image to generate a third image.

According to the dual camera apparatus, the first camera is configured to have low resolution and large single pixel size, the second camera is configured to have high resolution and small single pixel size.

According to the dual camera apparatus, the resolution of the first camera is configured to be less than or equal to a first resolution threshold set in advance, the single pixel size of the first camera is configured to be greater than or equal to a first single pixel size threshold set in advance; the resolution of the second camera is configured to be greater than or equal to a second resolution threshold set in advance, the single pixel size of the second camera is configured to be less than or equal to a second single pixel size threshold set in advance.

According to the dual camera apparatus, the first resolution threshold and the second resolution threshold can be the same or different; the first single pixel size threshold and the second single pixel size threshold can be the same or different.

According to the dual camera apparatus, the first resolution threshold is 8 M, the second resolution threshold is 13 M; the first single pixel size threshold is $1.5*1.5$ $\mu m^2$, the second single pixel size threshold is $1.4*1.4$ $\mu m^2$.

According to the dual camera apparatus, the image processor further includes: a first extracting sub unit, configured to extract a first color signal from the first image and extract a second luminance signal from the second image; a first synthesizing sub unit, configured to synthesize the first color signal and the second luminance signal to generate the third image.

According to the dual camera apparatus, the image processor further includes: a second extracting sub unit, configured to extract a first color signal and a first luminance signal from the first image and extract a second luminance signal from the second image; a second synthesizing unit, configured to synthesize the first luminance signal and the second luminance signal to obtain a third luminance signal and synthesize the first color signal and the third luminance signal to generate the third image.

According to the dual camera apparatus, the image processor further includes: a third extracting sub unit, configured to extract a first color signal and a first luminance signal from the first image and extract a second color signal and a second luminance signal from the second image; a third synthesizing sub unit, configured to synthesize the first color signal and the second color signal to obtain a third color signal, synthesize the first luminance signal and the second luminance signal to obtain a third luminance signal, and synthesize the third color signal and the third luminance signal to generate the third image.

According to the dual camera apparatus, the image processor further includes: a fourth extracting sub unit, configured to extract a first color signal from the first image and extract a second color signal and a second luminance signal from the second image; a fourth synthesizing sub unit, configured to synthesize the first color signal and the second color signal to obtain a third color signal and synthesize the third color signal and the second luminance signal to generate the third image.

According to the dual camera apparatus, the first camera is a color camera, and the second camera is a monochrome camera.

With aid of the dual camera module of the present disclosure, the deficiency of a single camera module can be compensated. The dual camera module of the present disclosure has the first camera with large single pixel size and the second camera with high resolution, the first image is captured by the first camera with large single pixel size, whereby color noise can be reduced and image quality can be improved; the second image is captured by the second camera with high resolution, thus luminance noise can be reduced, besides, better luminance and detailed expression can be realized; the first image and the second image are synthesized to generate the third image. By means of the dual camera module provided herein, the color noise and the luminance noise of an image can be reduced by using two kinds of cameras and utilizing the advantages thereof. As one implementation, the first camera is a camera with low resolution and large single pixel size; the second camera is a camera with high resolution and small single pixel size. The dual camera module of the present disclosure can optimize the color noise and the luminance noise of the image and further improve image quality without increasing the module height; alternatively, the dual camera module of the present disclosure can further reduce the module height without reducing image quality, so as to comply with the tendency that terminal equipment is becoming thinner.

DETAILED DESCRIPTION

To make the objective, technical solutions and advantages of the present disclosure easier to understand, the present disclosure will be described in further detail with refer to the accompanying drawings and the following implementations. It should be understood that specific implementations or embodiments described herein are merely used to explain the present disclosure and are not intended for restriction.

Figure 1:
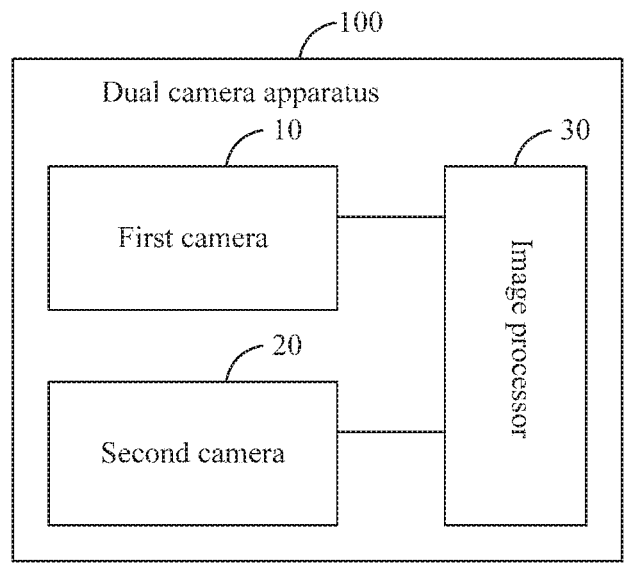
FIG. 1 is a structure schematic diagram illustrating a dual camera module of the present disclosure.

FIG. 1 is a structure schematic diagram illustrating a dual camera apparatus. In the following, take a dual camera module as an example of the dual camera apparatus. As shown in FIG. 1, a dual camera module 100 can be applied to smart phones, tablet PCs, digital cameras, and other terminal equipment. The dual camera apparatus 100 includes a first camera 10, a second camera 20, and an image processor 30 such as an image synthesizing unit.

The first camera (or referred to as "camera lens") 10 is a camera with large single pixel size and is configured to generate a first image. "Single pixel size" refers to the area of a single pixel. The single pixel size of the first camera 10 is greater than or equal to a first single pixel size threshold set in advance; that is to say, the camera with large single pixel size refers to a camera with single pixel size greater than or equal to the first single pixel size threshold. Currently, a camera with single pixel size greater than or equal to $1.5*1.5$ $\mu m^2$ (square microns) will be deemed as the camera with large single pixel size. The first single pixel size threshold is not limited to 1.5*1.5 μm², it will change constantly with the continuous progress of camera technology. The first camera 10 can collect optical signals to generate the first image. Since larger single pixel size is adopted in the first camera 10, better optical signals can be obtained, color noise can be reduced, and image quality can be improved.

The second camera 20 is a camera with high resolution and is configured to generate a second image. "Resolution" refers to the number of pixels contained in per inch unit. The resolution of the second camera is greater than or equal to a second luminance threshold set in advance; that is to say, the camera with high resolution refers to a camera with resolution greater than or equal to a second resolution threshold. Currently, a camera with resolution greater than or equal to 8 M will be deemed as the camera with high resolution. The second resolution threshold is not limited to 8 M, it will change constantly with the continuous progress of camera technology. The second camera 20 can collect optical signals to generate the second image. Since the second camera 20 has high resolution, light sensitivity can be improved, luminance noise of an image can be smaller, and better luminance and detailed expression can be realized.

The image processor 30 is configured to synthesize the first image and the second image to generate a third image. Image contents of the first image, the second image, and the third image are pretty much the same; however, the third image can have advantages of both the first image and the second image, that is, color noise can be reduced and better image quality can be obtained, furthermore, luminance noise can be smaller, and better luminance and detailed expression can be realized.

As one implementation, the first camera 10 can be a camera with low resolution and large single pixel size; the second camera 20 can be a camera with high resolution and small single pixel size. The first camera 10 is configured to collect optical signals to generate the first image. Since larger single pixel size is adopted in the first camera 10, better optical signals can be obtained, color noise can be reduced, and image quality can be improved. At the same time, since the first camera 10 has low resolution, there is no need to increase the module height of the dual camera module 100. The second camera 20 is configured to collect optical signals to generate the second image. Since the second camera 20 has high resolution, light sensitivity can be improved, luminance noise of an image can be smaller, and better luminance and detailed expression can be realized. Moreover, since the first camera 10 has small single pixel size, there is no need to increase the module height of the dual camera module 100. For example, the first camera 10 is a color camera and the second camera 20 is a monochrome camera.

As another implementation, the resolution of the first camera 10 is less than or equal to a first resolution threshold set in advance, and the single pixel size of the first camera 10 is greater than or equal to a first single pixel size threshold set in advance; the resolution of the second camera 20 is greater than or equal to a second resolution threshold set in advance, and the single pixel size of the second camera 20 is less than or equal to a second single pixel size threshold set in advance. The first resolution threshold and the second resolution threshold can be the same or different; similarly, the first single pixel size threshold and the second single pixel size threshold can be the same or different. For example, the first resolution threshold is 8 M (megabytes), that is, the resolution of a camera will be regard as low resolution if it is less than or equal to 8 M; the second resolution threshold is 13 M, that is, the resolution of a camera will be regard as high resolution if it is greater than or equal to 13 M; the first single pixel size threshold is 1.5*1.5 μm², that is, the single pixel size of a camera will be regard as large single pixel size if it is greater than or equal to 1.5*1.5 μm²; the second single pixel size threshold is 1.4*1.4 μm², that is, the single pixel size of a camera will be regard as small single pixel size if it is less than or equal to 1.4*1.4 μm².

An exemplary design principle of the dual camera module 100 according the implementation of the present disclosure is as follows: under conditions of a fixed module height, with the decrease of the resolution of a camera, the single pixel size will become larger, and there will be less color noise and more luminance noise, and as a result, better color signals can be output; similarly, under conditions of a fixed module height, with the increase of the resolution of the camera, the single pixel size will become smaller, and there will be more color noise and less luminance noise, and as a result, better color signals can also be output. As can be seen, with aid of the two kinds of cameras, color noise and luminance noise of an image can be further optimized without increasing the module height of the camera module and therefore, image quality as well as image luminance and details can be improved.

In terms of hardware, similar to circuits of other dual cameras, two camera circuit designs can be employed in the dual camera module 100 according to the implementation of the present disclosure. Correspondingly, in terms of software, codes have to be programmed to drive the dual cameras; an image synthesis algorithm will be invoked after data of the two cameras are acquired so as to obtain an image with higher resolution. In this way, when the image is enlarged, loss of image details are less and the display of the image details can be more delicate. Based on the combination of two cameras, the dual camera module 100 can have a regular module height; in this case, the present disclosure has the following advantages: (1) color noise signals can be reduced; (2) luminance and details of a camera can be enhanced; (3) larger resolution can be output. On the other hand, the dual camera module 100 can have a reduced module height; in such a situation, it is possible to maintain the same image quality as other cameras with the identical resolution.

Figure 2:
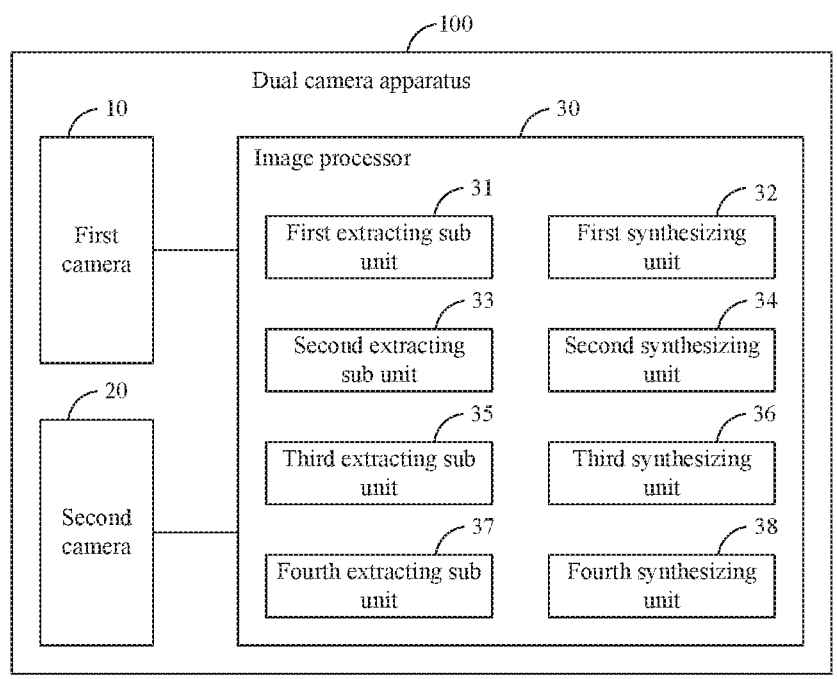
FIG. 2 is a structure schematic diagram illustrating an exemplary dual camera module of the present disclosure.

FIG. 2 is a structure schematic diagram illustrating an exemplary dual camera module of the present disclosure. The dual camera module 100 can be applied to smart phones, tablet PCs, digital cameras and other terminals. The dual camera module 100 includes a first camera 10, a second camera 20, and an image processor 30.

The first camera 10 is a camera with low resolution and large single pixel size, and is configured to generate a first image. For example, the first camera 10 is a color camera.

The second camera 20 is a camera with high resolution and small single pixel size, and is configured to generate a second image. For example, the second camera is a monochrome camera.

As another implementation, the resolution of the first camera 10 is less than or equal to a first resolution threshold set in advance, and the single pixel size of the first camera 10 is greater than or equal to a first single pixel size threshold set in advance; the resolution of the second camera 20 is greater than or equal to a second resolution threshold set in advance, and the single pixel size of the second camera 20 is less than or equal to a second single pixel size threshold set in advance. The first resolution threshold and the second resolution threshold can be the same or different; similarly, the first single pixel size threshold and the second single pixel size threshold can be the same or different. For example, the first resolution threshold is 8 M (megabytes), that is, the resolution of a camera will be regard as low resolution if it is less than or equal to 8 M; the second resolution threshold is 13 M, that is, the resolution of a camera will be regard as high resolution if it is greater than or equal to 13 M; the first single pixel size threshold is $1.5*1.5 \ \mu m^2$, that is, the single pixel size of a camera will be regard as large single pixel size if it is greater than or equal to $1.5*1.5 \ \mu m^2$; the second single pixel size threshold is $1.4*1.4 \ \mu m^2$, that is, the single pixel size of a camera will be regard as small single pixel size if it is less than or equal to $1.4*1.4 \ \mu m^2$.

The image processor 30 is configured to synthesize the first image and the second image to generate a third image.

According to a first implementation of the present disclosure, the first camera 10 is a color camera with low resolution (for example, less than or equal to 8 M) and large single pixel size (for example, greater than or equal to $1.5*1.5 \ \mu m^2$). Since the first camera 10 has larger single pixel size, better optical signals can be obtained upon optical signal collection, moreover, color noise can be reduced and better image quality can be obtained. When opened, the first camera 10 can output luminance signals and color signals simultaneously. The second camera 20 is a monochrome camera with high resolution (for example, between 13 M~20 M) and small single pixel size (for example, less than or equal to $1.4*1.4 \ \mu m^2$). In this way, the second camera 20 can use a monochrome camera with high resolution for outputting, therefore, light sensitivity can be enhanced, luminance noise of an image can be smaller, and better luminance and detailed expression can be obtained. When opened, the second camera 20 can output luminance signals only and therefore no color signal is output.

The image processor 30 can further include the following elements.

The image processor 30 has a first extracting sub unit 31, configured to extract a first color signal from the first image and extract a second luminance signal from the second image. The quality of a first luminance signal contained in the first image is not good enough; therefore, the first luminance signal is not extracted and is ignored directly.

The image processor 30 has a first synthesizing sub unit 32, configured to synthesize the first color signal and the second luminance signal to generate the third image. The third image can have advantages of both the first image and the second image, that is, color noise can be reduced and better image quality can be obtained; besides, luminance noise is smaller, and luminance as well as detailed expression is better.

According to a second implementation of the present disclosure, the first camera 10 is a color camera with low resolution and large single pixel size, for example, the resolution is less than or equal to 8 M, and the single pixel size is greater than or equal to $1.5*1.5 \ \mu m^2$. Since the first camera 10 has larger single pixel size, better optical signals can be obtained upon optical signal collection, moreover, color noise can be reduced and better image quality can be obtained. When opened, the first camera 10 can output luminance signals and color signals simultaneously. The second camera 20 is a monochrome camera with high resolution (for example, between 13 M~20 M) and small single pixel size (for example, less than or equal to $1.4*1.4 \ \mu m^2$). In this way, the second camera 20 can use a monochrome camera with high resolution for outputting, therefore, light sensitivity can be enhanced, luminance noise of an image can be smaller, and luminance and detailed expression can be better. When opened, the second camera 20 can output luminance signals only and therefore no color signal is output.

The image processor 30 is further configured to perform the image generation method described above. As one implementation, the processor 30 can further includes the following components.

The image processor 30 has a second extracting sub unit 33, configured to extract a first color signal and a first luminance signal from the first image and extract a second luminance signal from the second image.

The image processor 30 has a second synthesizing unit 34, configured to synthesize the first luminance signal and the second luminance signal to obtain a third luminance signal and synthesize the first color signal and the third luminance signal to generate the third image. The synthesized third luminance signal is dominated by the second luminance signal because of the poor quality of the first luminance signal. The third image can have advantages of both the first image and the second image, that is, color noise can be reduced and image quality can be improved; besides, luminance noise can be smaller and luminance as well as detailed expression can be better.

According to a third implementation of the present disclosure, the first camera 10 is a color camera with low resolution and large single pixel size, for example, the resolution is less than or equal to 8 M, and the single pixel size is greater than or equal to $1.5*1.5 \ \mu m^2$. Since the first camera 10 has larger single pixel size, better optical signals can be obtained upon optical signal collection, moreover, color noise can be reduced and better image quality can be obtained. When opened, the first camera 10 can output luminance signals and color signals simultaneously. The second camera 20 is a color camera with high resolution (for example, between 13 M~20 M) and small single pixel size (for example, less than or equal to $1.4*1.4 \ \mu m^2$). In this way, the second camera 20 can use a camera with high resolution for outputting, therefore, light sensitivity can be enhanced, luminance noise of an image can be smaller, and luminance and detailed expression can be better. When opened, the second camera 20 can output luminance signals and color signals simultaneously.

The image processor 30 further includes the following components.

The image processor 30 has a third extracting sub unit 35, configured to extract a first color signal and a first luminance signal from the first image and extract a second color signal and a second luminance signal from the second image.

The image processor 30 has a third synthesizing sub unit 36, configured to synthesize the first color signal and the second color signal to obtain a third color signal, synthesize the first luminance signal and the second luminance signal to obtain a third luminance signal, and synthesize the third color signal and the third luminance signal to generate the third image. The synthesized third color signal is dominated by the first color signal because of the poor quality of the second color signal. The synthesized third luminance signal is dominated by the second luminance signal because of the poor quality of the first luminance signal. The third image can have advantages of both the first image and the second image, that is, color noise can be reduced and image quality can be improved; besides, luminance noise can be smaller and luminance as well as detailed expression can be better.

According to a fourth implementation of the present disclosure, the first camera 10 is a color camera with low resolution and large single pixel size, for example, the resolution is less than or equal to 8 M, and the single pixel size is greater than or equal to 1.5*1.5 µm². Since the first camera 10 has larger single pixel size, better optical signals can be obtained upon optical signal collection, moreover, color noise can be reduced and better image quality can be obtained. When opened, the first camera 10 can output luminance signals and color signals simultaneously. The second camera 20 is a color camera with high resolution (for example, between 13 M~20 M) and small single pixel size (for example, less than or equal to 1.4*1.4 µm²). In this way, the second camera 20 can use a camera with high resolution for outputting, therefore, light sensitivity can be enhanced, luminance noise of an image can be smaller, and luminance and detailed expression can be better. When opened, the second camera 20 can output luminance signals and color signals simultaneously.

The image processor 30 further includes the following components.

The image processor 30 has a fourth extracting sub unit 37, configured to extract a first color signal from the first image and extract a second color signal and a second luminance signal from the second image. A first luminance signal contained in the first image is not extracted and is ignored directly because of the poor quality thereof.

The image processor 30 has a fourth synthesizing unit 38, configured to synthesize the first color signal and the second color signal to obtain a third color signal and synthesize the third color signal and the second luminance signal to generate the third image. The synthesized third color signal is dominated by the first color signal because of the poor quality of the second color signal. The third image can have advantages of both the first image and the second image, that is, color noise can be reduced and image quality can be improved; besides, luminance noise can be smaller and luminance as well as detailed expression can be better.

With aid of different types of cameras, problems (such as color noise, luminance noise, and the like) that cannot be solved in weak light conditions can be optimized and solved; besides, an image with higher resolution can be synthesized, in which image quality and image size can be improved significantly. On the other hand, module height can be reduced without influencing normal camera effects; therefore, thickness of terminals such as smart phones can be reduced and feeling/product texture of terminals can be enhanced.

Figure 3:
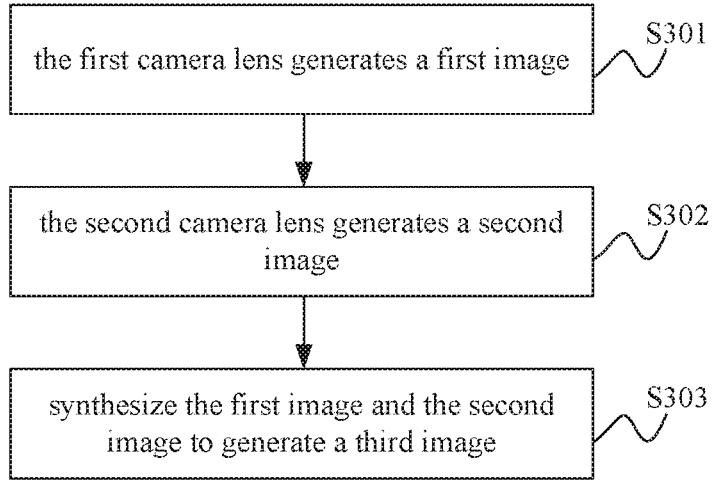
FIG. 3 is a flow chart illustrating an image generation method based on a dual camera module of the present disclosure.

FIG. 3 is a flow chart illustrating an image generation method based on a dual camera module of the present disclosure. The method can be implemented through the dual camera module 100 of FIG. 1 or FIG. 2, among which the dual cameral module 100 includes a first camera 10 with large single pixel size and a second camera 20 with high resolution.

The method includes the following steps.

Step 301, the first camera 10 generates a first image.

"Single pixel size" refers to the area of a single pixel. The single pixel size of the first camera 10 is greater than or equal to a first single pixel size threshold set in advance; that is to say, the camera with large single pixel size refers to a camera with single pixel size greater than or equal to the first single pixel size threshold. Currently, a camera with single pixel size greater than or equal to 1.5*1.5 µm² (square microns) will be deemed as the camera with large single pixel size. The first single pixel size threshold is not limited to 1.5*1.5 µm², and it can change constantly with the continuous progress of camera technology. The first camera 10 can collect optical signals to generate the first image. Since larger single pixel size is adopted in the first camera 10, better optical signals can be obtained, color noise can be reduced, and image quality can be improved.

Step 302, the second camera 20 generates a second image.

"Resolution" refers to the number of pixels contained in per inch unit. The resolution of the second camera is greater than or equal to a second luminance threshold set in advance; that is to say, the camera with high resolution refers to a camera with resolution greater than or equal to a second resolution threshold. Currently, a camera with resolution greater than or equal to 8 M will be deemed as the camera with high resolution. The second resolution threshold is not limited to 8 M; it will change constantly with the continuous progress of camera technology. The second camera 20 can collect optical signals to generate the second image. Since the second camera 20 has high resolution, light sensitivity can be improved, luminance noise of an image can be smaller, and luminance as well as detailed expression can be better.

Step 303, the first image and the second image are synthesized to generate a third image.

Image contents of the first image, the second image, and the third image are pretty much the same; however, the third image can have advantages of both the first image and the second image, that is, color noise can be reduced and better image quality can be obtained; furthermore, luminance noise can be smaller, and luminance as well as detailed expression can be better.

As one implementation, the first camera 10 can be a camera with low resolution and large single pixel size; the second camera 20 can be a camera with high resolution and small single pixel size. The first camera 10 is configured to collect optical signals to generate the first image. Since larger single pixel size is adopted in the first camera 10, better optical signals can be obtained, color noise can be reduced, and image quality can be improved. At the same time, since the first camera 10 has low resolution, there is no need to increase the module height of the dual camera module 100. The second camera 20 is configured to collect optical signals to generate the second image. Since the second camera 20 has high resolution, light sensitivity can be improved, luminance noise of an image can be smaller, and luminance as well as detailed expression can be better. Moreover, since the first camera 10 has small single pixel size, there is no need to increase the module height of the dual camera module 100. For example, the first camera 10 is a color camera and the second camera 20 is a monochrome camera.

As another implementation, the resolution of the first camera 10 is less than or equal to a first resolution threshold set in advance, and the single pixel size of the first camera 10 is greater than or equal to a first single pixel size threshold set in advance; the resolution of the second camera 20 is greater than or equal to a second resolution threshold set in advance, and the single pixel size of the second camera 20 is less than or equal to a second single pixel size threshold set in advance. The first resolution threshold and the second resolution threshold can be the same or different; similarly, the first single pixel size threshold and the second single pixel size threshold can be the same or different. For example, the first resolution threshold is 8 M (megabytes), that is, the resolution of a camera will be regard as low resolution if it is less than or equal to 8 M; the second resolution threshold is 13 M, that is, the resolution of a camera will be regard as high resolution if it is greater than or equal to 13 M; the first single pixel size threshold is 1.5*1.5 µm², that is, the single pixel size of a camera will be regard as large single pixel size if it is greater than or equal to 1.5*1.5 μm²; the second single pixel size threshold is 1.4*1.4 μm², that is, the single pixel size of a camera will be regard as small single pixel size if it is less than or equal to 1.4*1.4 μm².

According to implementations of the present disclosure, consider using dual cameras to make up for shortcomings of a single camera. With aid of a color camera and a monochrome camera with larger single pixel size (for example, 1.5*1.5 μm²), problems of imaging quality of an image can be addressed; color noise, luminance noise, and image quality can be optimized and image texture can be enhanced, the user can be provided with good image texture display even if a picture is enlarged.

Figure 4:
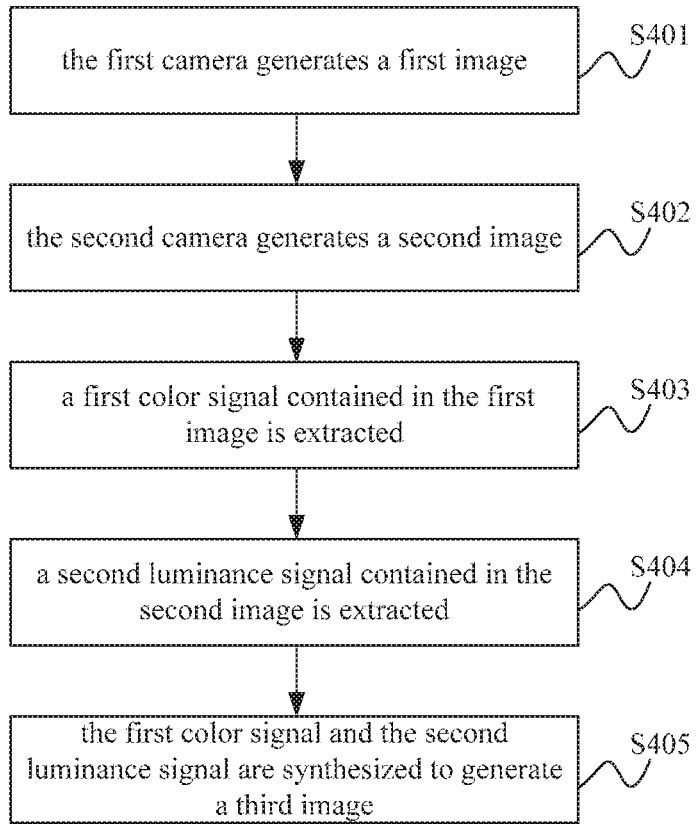
FIG. 4 is a flow chart illustrating an image generation method based on a dual camera module according to a first implementation of the present disclosure.

FIG. 4 is a flow chart illustrating an image generation method based on a dual camera module according to a first implementation of the present disclosure. The method can be implemented through the dual camera module 100 illustrated in FIG. 2. The dual camera module 100 includes: a first camera 10 with low resolution and large single pixel size; and a second camera 20 with high resolution and small single pixel size.

The method includes the following steps.

Step 401, the first camera 10 generates a first image.

For example, the first camera 10 is a color camera with low resolution and large single pixel size, for example, the resolution is less than or equal to 8 M, and the single pixel size is greater than or equal to 1.5*1.5 μm². Since the first camera 10 has larger single pixel size, better optical signals can be obtained upon optical signal collection, moreover, color noise can be reduced and better image quality can be obtained. When opened, the first camera 10 can output luminance signals and color signals simultaneously.

Step 402, the second camera 20 generates a second image.

For example, the second camera 20 is a monochrome camera with high resolution and small single pixel size, the resolution can between 13 M~20 M and the single pixel size is less than or equal to 1.4*1.4 μm². In this way, the second camera 20 can use a monochrome camera with high resolution for outputting, therefore, light sensitivity can be enhanced, luminance noise of an image can be smaller, and luminance and detailed expression can be better. When opened, the second camera 20 can output luminance signals only and therefore no color signal is output.

Step 403, a first color signal contained in the first image is extracted.

A first luminance signal contained in the first image is not extracted and is ignored directly because of the poor quality thereof.

Step 404, a second luminance signal contained in the second image is extracted.

Step 405, the first color signal and the second luminance signal are synthesized to generate a third image.

The third image can have advantages of both the first image and the second image, that is, color noise can be reduced and image quality can be improved; besides, luminance noise can be smaller and luminance as well as detailed expression can be better.

Figure 5:
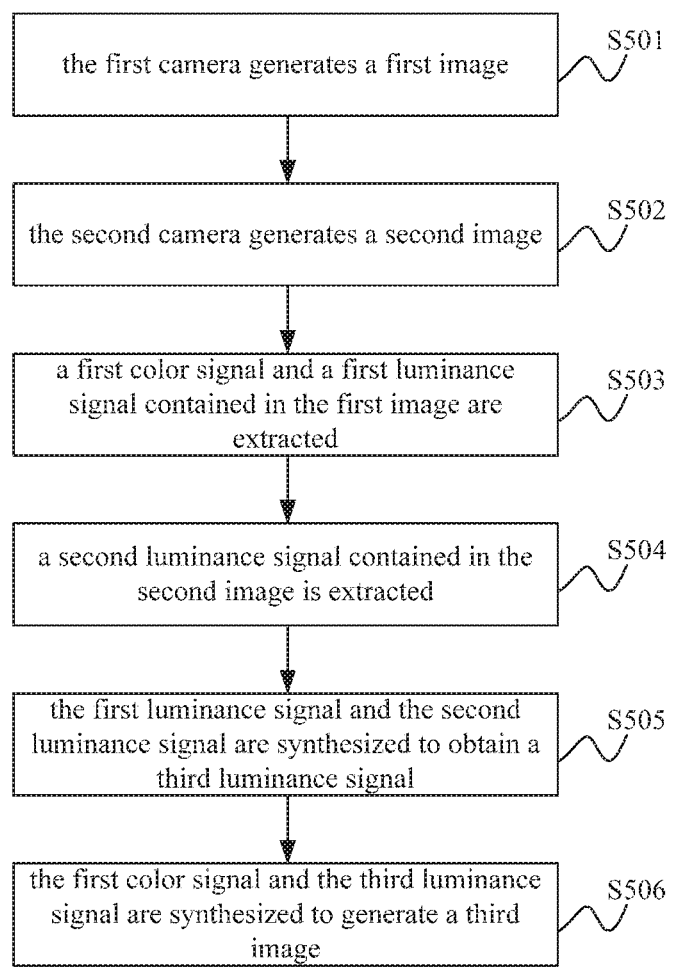
FIG. 5 is a flow chart illustrating an image generation method based on a dual camera module according to a second implementation of the present disclosure.

FIG. 5 is a flow chart illustrating an image generation method based on a dual camera module according to a second implementation of the present disclosure. The method can be implemented through the dual camera module 100 illustrated in FIG. 2. The dual camera module 100 includes: a first camera 10 with low resolution and large single pixel size; and a second camera 20, with high resolution and small single pixel size.

The method includes the following steps.

Step 501, the first camera 10 generates a first image.

For example, the first camera 10 is a color camera with low resolution and large single pixel size, for example, the resolution is less than or equal to 8 M, and the single pixel size is greater than or equal to 1.5*1.5 μm². Since the first camera 10 has larger single pixel size, better optical signals can be obtained upon optical signal collection, moreover, color noise can be reduced and better image quality can be obtained. When opened, the first camera 10 can output luminance signals and color signals simultaneously.

Step 502, the second camera 20 generates a second image.

For example, the second camera 20 is a monochrome camera with high resolution and small single pixel size, the resolution can between 13 M~20 M and the single pixel size is less than or equal to 1.4*1.4 μm². In this way, the second camera 20 can use a monochrome camera with high resolution for outputting, therefore, light sensitivity can be enhanced, luminance noise of an image can be smaller, and luminance and detailed expression can be better. When opened, the second camera 20 can output luminance signals only and therefore no color signal is output.

Step 503, a first color signal and a first luminance signal contained in the first image are extracted.

Step 504, a second luminance signal contained in the second image is extracted.

Step 505, the first luminance signal and the second luminance signal are synthesized to obtain a third luminance signal.

The third luminance signal is dominated by the second luminance signal because of the poor quality of the first luminance signal.

Step 506, the first color signal and the third luminance signal are synthesized to generate a third image.

The third image can have advantages of both the first image and the second image, that is, color noise can be reduced and image quality can be improved; besides, luminance noise can be smaller and luminance as well as detailed expression can be better.

Figure 6:
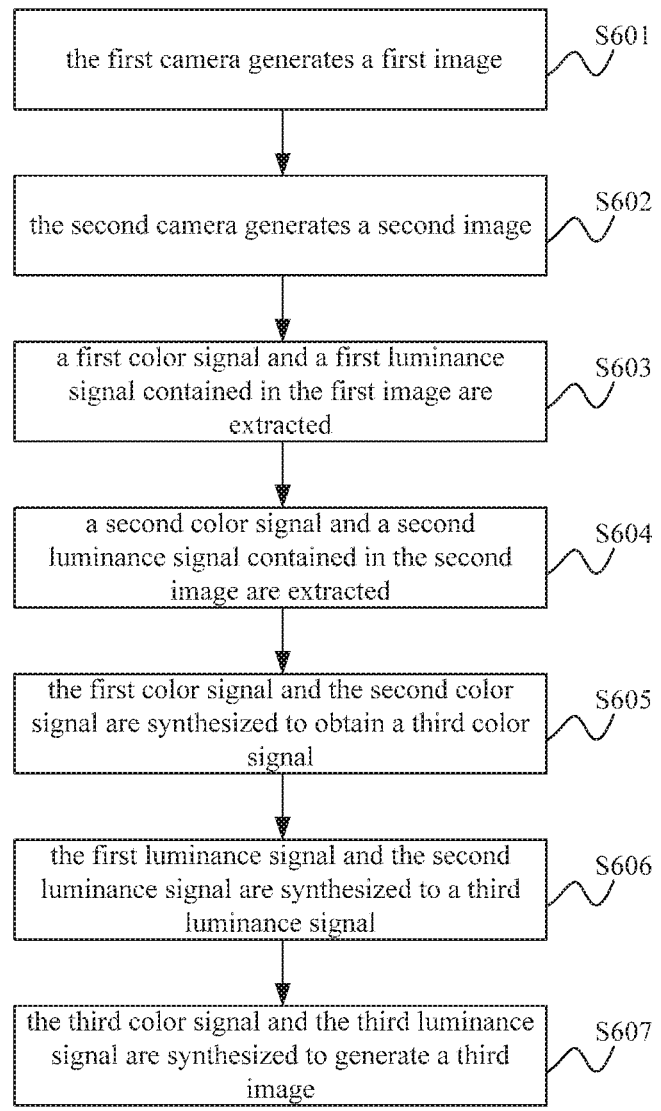
FIG. 6 is a flow chart illustrating an image generation method based on a dual camera module according to a third implementation of the present disclosure.

FIG. 6 is a flow chart illustrating an image generation method based on a dual camera module according to a third implementation of the present disclosure. The method can be implemented through the dual camera module 100 illustrated in FIG. 2. The dual camera module 100 includes: a first camera 10 with low resolution and large single pixel size; and a second camera 20, with high resolution and small single pixel size.

The method includes the following steps.

Step 601, the first camera 10 generates a first image.

For example, the first camera 10 is a color camera with low resolution and large single pixel size, for example, the resolution is less than or equal to 8 M, and the single pixel size is greater than or equal to 1.5*1.5 μm². Since the first camera 10 has larger single pixel size, better optical signals can be obtained upon optical signal collection, moreover, color noise can be reduced and better image quality can be obtained. When opened, the first camera 10 can output luminance signals and color signals simultaneously.

Step 602, the second camera 20 generates a second image.

For example, the second camera 20 is a color camera with high resolution and small single pixel size, the resolution can between 13 M~20 M and the single pixel size is less than or equal to 1.4*1.4 μm². In this way, the second camera 20 can use a camera with high resolution for outputting, therefore, light sensitivity can be enhanced, luminance noise of an image can be smaller, and luminance and detailed expression can be better. When opened, the second camera 20 can output luminance signals and color signals simultaneously.

Step 603, a first color signal and a first luminance signal contained in the first image are extracted.

Step 604, a second color signal and a second luminance signal contained in the second image are extracted.

Step 605, the first color signal and the second color signal are synthesized to obtain a third color signal.

The synthesized third signal is dominated by the first color signal because of the poor quality of the second color signal.

Step 606, the first luminance signal and the second luminance signal are synthesized to a third luminance signal.

The synthesized third luminance signal is dominated by the second luminance signal because of the poor quality of the first luminance signal.

Step 607, the third color signal and the third luminance signal are synthesized to generate a third image.

The third image can have advantages of both the first image and the second image, that is, color noise can be reduced and image quality can be improved; besides, luminance noise can be smaller and luminance as well as detailed expression can be better.

Figure 7:
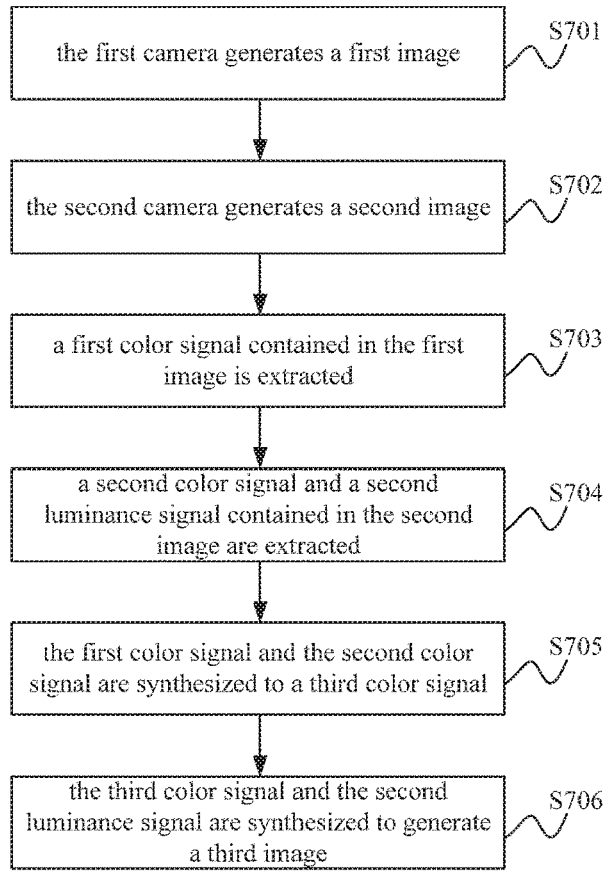
FIG. 7 is a flow chart illustrating an image generation method based on a dual camera module according to a fourth implementation of the present disclosure.

FIG. 7 is a flow chart illustrating an image generation method based on a dual camera module according to a fourth implementation of the present disclosure. The method can be implemented through the dual camera module 100 illustrated in FIG. 2. The dual camera module 100 includes: a first camera 10 with low resolution and large single pixel size; and a second camera 20, with high resolution and small single pixel size.

The method includes the following steps.

Step 701, the first camera 10 generates a first image.

For example, the first camera 10 is a color camera with low resolution and large single pixel size, for example, the resolution is less than or equal to 8 M, and the single pixel size is greater than or equal to $1.5*1.5$ $\mu m^2$. Since the first camera 10 has larger single pixel size, better optical signals can be obtained upon optical signal collection, moreover, color noise can be reduced and better image quality can be obtained. When opened, the first camera 10 can output luminance signals and color signals simultaneously.

Step 702, the second camera 20 generates a second image.

For example, the second camera 20 is a color camera with high resolution and small single pixel size, the resolution can between 13 M~20 M and the single pixel size is less than or equal to $1.4*1.4$ $\mu m^2$. In this way, the second camera 20 can use a camera with high resolution for outputting, therefore, light sensitivity can be enhanced, luminance noise of an image can be smaller, and luminance and detailed expression can be better. When opened, the second camera 20 can output luminance signals and color signals simultaneously.

Step 703, a first color signal contained in the first image is extracted.

A first luminance signal contained in the first image is not extracted and is ignored directly because of the poor quality thereof.

Step 704, a second color signal and a second luminance signal contained in the second image are extracted.

Step 705, the first color signal and the second color signal are synthesized to a third color signal.

The synthesized third color signal is dominated by the first color signal since the second color signal is poor in quality.

Step 706, the third color signal and the second luminance signal are synthesized to generate a third image.

The third image can have advantages of both the first image and the second image, that is, color noise can be reduced and image quality can be improved; besides, luminance noise can be smaller and luminance as well as detailed expression can be better.

Application scenarios of the present disclosure include but not limited to the following.

1. Under the premise of a fixed module height, with aid of the dual camera module according to implementations of the present disclosure, pictures captured in a weak light environment can be more bright and delicate; compared with the picture captured via a single module, less color noise and luminance noise is generated.

2. Under the premise of not reducing the image quality, module height can be reduced when using the dual camera module according implementations of the present disclosure; therefore, terminals such as smart phones can be made thinner, and feeling or texture of the terminals can be improved.

In summary, the dual camera module according to implementations of the present disclosure can make up for deficiencies of a signal camera module. The dual camera module includes a first camera with large single pixel size and a second camera with high resolution. Color noise can be reduced by the first image captured by the first camera with large single pixel size; moreover, color noise can be reduced and therefore image quality can be better. Luminance noise can be reduced by the second image captured by the second camera with high resolution, therefore better luminance and detailed expression can be obtained. The first image and the second image are synthesized to generate a third image. Based on this, with aid of different types of cameras, color noise and luminance noise of an image can be reduced by taking advantage of two kinds of cameras; as a result, image quality as well as image luminance and detail can be enhanced. For example, the first camera is a camera with low resolution and large single pixel size, the second camera is a camera with high resolution and small single pixel size. Technical schemes of the present disclosure can optimize color noise and luminance noise of an image without increasing the module height of the dual camera module, and image quality can be improved. Otherwise, technical schemes of the present disclosure can further decrease the module height without degrading the image quality so as to comply with the tendency that terminal equipment is becoming thinner.

Figure 8:
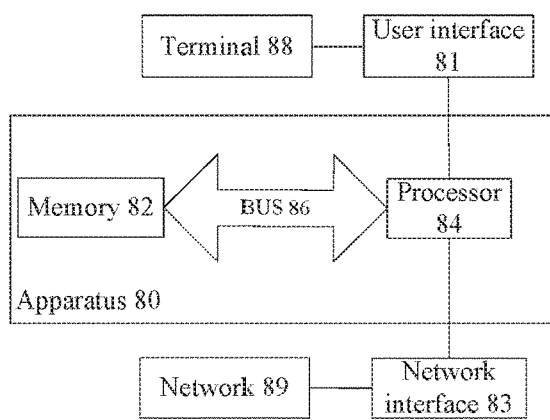
FIG. 8 is a structure schematic diagram illustrating an apparatus according to an implementation of the present disclosure.

According to a further implementation of the present disclosure, it is provided an apparatus. FIG. 8 is a block diagram illustrating the apparatus.

As shown in FIG. 8, the hardware architecture of the apparatus 80 includes a memory 82 and at least one processor 84 (for clarity, only one processor is illustrated in the figure). Wherein the memory 82 and the processor 84 can be connected in a wired or wireless manner, for example, through a bus 86. For example, the apparatus 80 of the implementation can be a server in communicate with a wireless music system, or, can be a computing device built in the wireless music system.

To be specific, the memory 72 is configured to store computer-readable program code and can be ROM, RAM, CD-RAM, or any other removable storage medium; the processor 74 including hardware configured to invoke the computer-readable program code stored in the memory 72 to execute predetermined process, such as the methods or procedures according to the implementations of the present disclosure described above. To avoid unnecessarily obscuring the present disclosure, details of the methods or process are not provided here. In addition, as shown in FIG. 8, the processor 84 can but not necessarily connect to a terminal 88 through a user interface 81 or to a network 89 through a network interface 83. Alternatively, the processor 84 can also connect to an outside terminal or network in a wireless manner.

According to another implementation of the disclosure, it is provided a computer readable storage medium configured to store a program product for image generation based on a dual camera module. The program product including program codes, when executed on a computer system, adapted to cause the computer system to perform any of the quick transmission point handover method according to implementations described above. The computer readable storage medium can be disk, CD, Read-Only Memory (ROM), Random Access Memory (RAM), and so on.

The foregoing descriptions are merely preferred implementations or embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A method for image generation based on a dual camera module, the dual camera module comprising a first camera and a second camera, the method comprising:
    generating a first image by the first camera;
    generating a second image by the second camera,
    wherein the first camera is a camera with a low resolution and a large single pixel size, and the second camera is a camera with a high resolution and a small single pixel size; and
    synthesizing the first image and the second image to generate a third image, wherein the third image includes a third color signal dominated by a first color signal associated with the first image, wherein the third image includes a third luminance signal dominated by a second luminance signal associated with the second image,
    and wherein
    synthesizing the first image and the second image to generate the third image comprises:
    extracting a first color signal and the first luminance signal from the first image;
    extracting a second color signal and the second luminance signal from the second image;
    synthesizing the first color signal and the second color signal to obtain the third color signal;
    synthesizing the first luminance signal and the second luminance signal to obtain the third luminance signal; and
    synthesizing the third color signal and the third luminance signal to generate the third image.

2. The method of claim 1, wherein the low resolution of the first camera is less than or equal to a first predetermined resolution threshold, the large single pixel size of the first camera is greater than or equal to a first predetermined single pixel size threshold, the high resolution of the second camera is greater than or equal to a second predetermined resolution threshold, and the small single pixel size of the second camera is less than or equal to a second predetermined single pixel size threshold.

3. The method of claim 2, wherein the first predetermined resolution threshold and the second predetermined resolution threshold are the same or different, and the first predetermined single pixel size threshold and the second predetermined single pixel size threshold are the same or different.

4. The method of claim 3, wherein the first predetermined resolution threshold is 8 megabytes, the second predetermined resolution threshold is 13 megabytes, the first predetermined single pixel size threshold is $1.5*1.5\ \mu m^2$, and the second predetermined single pixel size threshold is $1.4*1.4\ \mu m^2$.

5. The method of claim 1, wherein synthesizing the first image and the second image to generate the third image comprises: extracting the first color signal from the first image; extracting the second luminance signal from the second image; and synthesizing the first color signal and the second luminance signal to generate the third image.

6. The method of claim 1, wherein the first camera is a color camera, and the second camera is a monochrome camera.

7. A dual camera apparatus, comprising:
    a first camera, configured to generate a first image;
    a second camera, configured to generate a second image,
    wherein the first camera is a camera with a low resolution and a large single pixel size; the second camera is a camera with a high resolution and a small single pixel size; and
    an image processor, configured to:
        synthesize the first image and the second image to generate a third image, wherein the third image includes a third color signal dominated by a first color signal associated with the first image, wherein the third image includes a third luminance signal dominated by a second luminance signal associated with the second image;
        extract the first color signal and a first luminance signal from the first image and extract a second color signal and the second luminance signal from the second image; and
        synthesize the first color signal and the second color signal to obtain the third color signal, synthesize the first luminance signal and the second luminance signal to obtain the third luminance signal, and synthesize the third color signal and the third luminance signal to generate the third image.

8. The dual camera apparatus of claim 7, wherein the low resolution of the first camera is less than or equal to a first predetermined resolution threshold, the large single pixel size of the first camera is greater than or equal to a first predetermined single pixel size threshold, the high resolution of the second camera is greater than or equal to a second predetermined resolution threshold, and the small single pixel size of the second camera is less than or equal to a second predetermined single pixel size threshold.

9. The dual camera apparatus of claim 8, wherein the first predetermined resolution threshold and the second predetermined resolution threshold are the same or different, and the first predetermined single pixel size threshold and the second predetermined single pixel size threshold are the same or different.

10. The dual camera apparatus of claim 9, wherein the first predetermined resolution threshold is 8 megabytes, the second predetermined resolution threshold is 13 megabytes, the first predetermined single pixel size threshold is $1.5*1.5\ \mu m^2$, and the second predetermined single pixel size threshold is $1.4*1.4\ \mu m^2$.

11. The dual camera apparatus of claim 7, wherein the image processor is further configured to: extract the first color signal from the first image and extract the second luminance signal from the second image; and synthesize the first color signal and the second luminance signal to generate the third image.

12. The dual camera apparatus of claim 7, wherein the first camera is a color camera and the second camera is a monochrome camera.

* * * * *